United States Patent
Yoon et al.

(10) Patent No.: US 12,550,141 B2
(45) Date of Patent: Feb. 10, 2026

(54) METHOD AND DEVICE FOR QUASI-STATIC SCHEDULING IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Seho Myung, Suwon-si (KR); Jeongho Yeo, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 469 days.

(21) Appl. No.: 18/154,420

(22) Filed: Jan. 13, 2023

(65) Prior Publication Data
US 2023/0156705 A1 May 18, 2023

Related U.S. Application Data

(63) Continuation of application No. PCT/KR2021/010101, filed on Aug. 3, 2021.

(30) Foreign Application Priority Data

Aug. 6, 2020 (KR) .................. 10-2020-0098667

(51) Int. Cl.
*H04W 72/1273* (2023.01)
*H04W 72/11* (2023.01)
*H04W 72/23* (2023.01)

(52) U.S. Cl.
CPC ........ *H04W 72/1273* (2013.01); *H04W 72/11* (2023.01); *H04W 72/23* (2023.01)

(58) Field of Classification Search
CPC . H04W 72/1273; H04W 72/11; H04W 72/23; H04W 72/0453; H04W 72/232;
(Continued)

(56) References Cited

U.S. PATENT DOCUMENTS 10,594,468 B2 3/2020 Liao et al.
2012/0176996 A1* 7/2012 Kim .................... H04L 5/0057
370/329

(Continued)

FOREIGN PATENT DOCUMENTS

JP 2020-061650 A 4/2020
KR 10-2019-0124334 A 11/2019

OTHER PUBLICATIONS

Search Report dated Oct. 26, 2021, issued by the International Searching Authority in counterpart International Application No. PCT/KR2021/010101 (PCT/ISA/210).
(Continued)

*Primary Examiner* — Kiet Tang
(74) *Attorney, Agent, or Firm* — Sughrue Mion, PLLC

(57) ABSTRACT

The present disclosure relates to a 5th generation (5G) or pre-5G communication system for supporting higher data transmission rates than 4th generation (4G) communication systems such as Long Term Evolution (LTE). According to an embodiment according to the present disclosure, provided is a method performed in a communication system by a terminal. The method performed by the terminal operation may include receiving configuration information about semi-static scheduling; receiving downlink control information (DCI) through a physical downlink control channel (PDCCH); checking whether the DCI activates the semi-static scheduling; checking whether the semi-static scheduling is configured in a bandwidth part (BWP), indicated by a BWP indicator included in the DCI, when the semi-static scheduling is activated; and discarding the DCI when the semi-static scheduling is not configured in the BWP.

15 Claims, 13 Drawing Sheets

(58) Field of Classification Search
CPC ........ H04W 72/0457; H04L 1/18; H04L 5/00; H04L 5/0096; H04L 1/1819
See application file for complete search history.

(56) References Cited

U.S. PATENT DOCUMENTS

| | | | |
|---|---|---|---|
| 2012/0195267 A1* | 8/2012 | Dai | H04B 7/06 370/329 |
| 2018/0279274 A1 | 9/2018 | Sun et al. | |
| 2019/0207705 A1 | 7/2019 | Zhou et al. | |
| 2019/0208436 A1 | 7/2019 | Zhou et al. | |
| 2020/0186319 A1 | 6/2020 | Liao et al. | |
| 2020/0351931 A1* | 11/2020 | Babaei | H04W 52/365 |

OTHER PUBLICATIONS

Written Opinion dated Oct. 26, 2021, issued by the International Searching Authority in counterpart International Application No. PCT/KR2021/010101 (PCT/ISA/237).

Moderator (Huawei), "Feature lead summary#1 on NR-U HARQ," R1-2004692, 3GPP TSG RAN WG1 Meeting #101-e, May 2020, Total 38 pages.

Keysight Technologies UK, "Correction to BWP Dependent Parameters for RA type 0 in MAC testcases," R5-201502, 3GPP TSG-RAN5 Meeting #87-e, May 2020, Total 59 pages.

Ericsson, "Remaining issues for BWP operation," R1-1807263, 3GPP TSG-RAN WG1#93, May 2018, Total 14 pages.

Communication issued Jul. 29, 2025 by the Korean Intellectual Property Office in counterpart Korean Patent Application No. 10-2020-0098667.

Samsung, "Corrections on Ultra Reliable Low Latency Communications Enhancements", R1-2003176, 3GPP TSG-RAN WG1 Meeting #100bis-e, e-Meeting, Apr. 20-30, 2020, Total 13 pages.

NTT Docomo Inc., "Outcome of email discussion on [100e-NR-L1enh_URLLC-eCG-02]", R1-2001423, 3GPP TSG RAN WG1 #100, e-Meeting, Feb. 24-Mar. 6, 2020, Total 20 pages.

3GPP TS38.212 v16.2.0, 3rd Generation Partnership Project; Technical Specification Group Radio Access Network; NR; Multiplexing and channel coding (Release 16), 2020.7.9, Total 153 pages.

* cited by examiner

METHOD AND DEVICE FOR QUASI-STATIC SCHEDULING IN WIRELESS COMMUNICATION SYSTEM

CROSS-REFERENCES TO RELATED APPLICATIONS

This application is a bypass continuation of International Application No. PCT/KR2021/010101, filed on Aug. 3, 2021, in the Korean Intellectual Property Office, which claims priority from Korean Patent Application No. 10-2020-0098667, filed on Aug. 6, 2020, the disclosures of which are incorporated herein in their entireties.

FIELD

The disclosure relates to a communication system, and more particularly, to an operation of a terminal and a base station for semi-persistent scheduling (SPS) or a configured grant.

BACKGROUND

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multipoints (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed components such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

SUMMARY

The disclosure provides a method and device related to at least one SPS configuration or configured grant configuration configured to a bandwidth part (BWP) when a plurality of BWPs are configured in a wireless communication system.

According to an embodiment of the disclosure, a method performed by a terminal in a communication system is provided. The method may include receiving configuration information on semi-static scheduling; receiving downlink control information (DCI) through a physical downlink control channel (PDCCH); determining whether the DCI activates semi-static scheduling; based on determining that the semi-static scheduling is activated, determining whether the semi-static scheduling is configured to a bandwidth part (BWP) indicated by a BWP indicator included in the DCI; and based on determining that the semi-static scheduling is not configured to the BWP, discarding the DCI.

Further, according to an embodiment of the disclosure, a method performed by a base station in a communication system is provided. The method may include transmitting configuration information on semi-static scheduling; transmitting downlink control information (DCI) through a physical downlink control channel (PDCCH); determining, when the semi-static scheduling is activated, whether the semi-static scheduling is configured to a bandwidth part (BWP) indicated by a BWP indicator included in the DCI; and skipping, based on determining that the semi-static scheduling is not configured to the BWP, an operation for the semi-static scheduling.

Further, according to an embodiment of the disclosure, a terminal is provided in a communication system. The terminal may include a transceiver; and a controller configured to receive configuration information on semi-static scheduling through the transceiver, to receive downlink control information (DCI) through a physical downlink control channel (PDCCH) through the transceiver, to determine whether the DCI activates semi-static scheduling, to determine whether the semi-static scheduling is configured to a bandwidth part (BWP) indicated by a BWP indicator included in the DCI when the semi-static scheduling is activated, and to discard the DCI when the semi-static scheduling is not configured to the BWP.

Further, according to an embodiment of the disclosure, a base station is provided in a communication system. The base station may include a transceiver; and a controller configured to transmit configuration information on semi-static scheduling through the transceiver, to transmit downlink control information (DCI) through a physical downlink control channel (PDCCH) through the transceiver, to determine whether the semi-static scheduling is configured to a bandwidth part (BWP) indicated by a BWP indicator included in the DCI based on the semi-static scheduling being activated, and to skip an operation for the semi-static scheduling based on the semi-static scheduling not being configured to the BWP.

According to various embodiments of the disclosure, in the case that a plurality of bandwidth parts are configured in a wireless communication system, an operation for at least one SPS configuration or configured grant configuration configured to the BWP is provided, thereby performing efficiently an operation corresponding to SPS or a configured grant.

Effects obtainable in the disclosure are not limited to the above-mentioned effects, and other effects not mentioned will be clearly understood by those of ordinary skill in the art to which the disclosure belongs from the description below.

DETAILED DESCRIPTION

Figure 1:
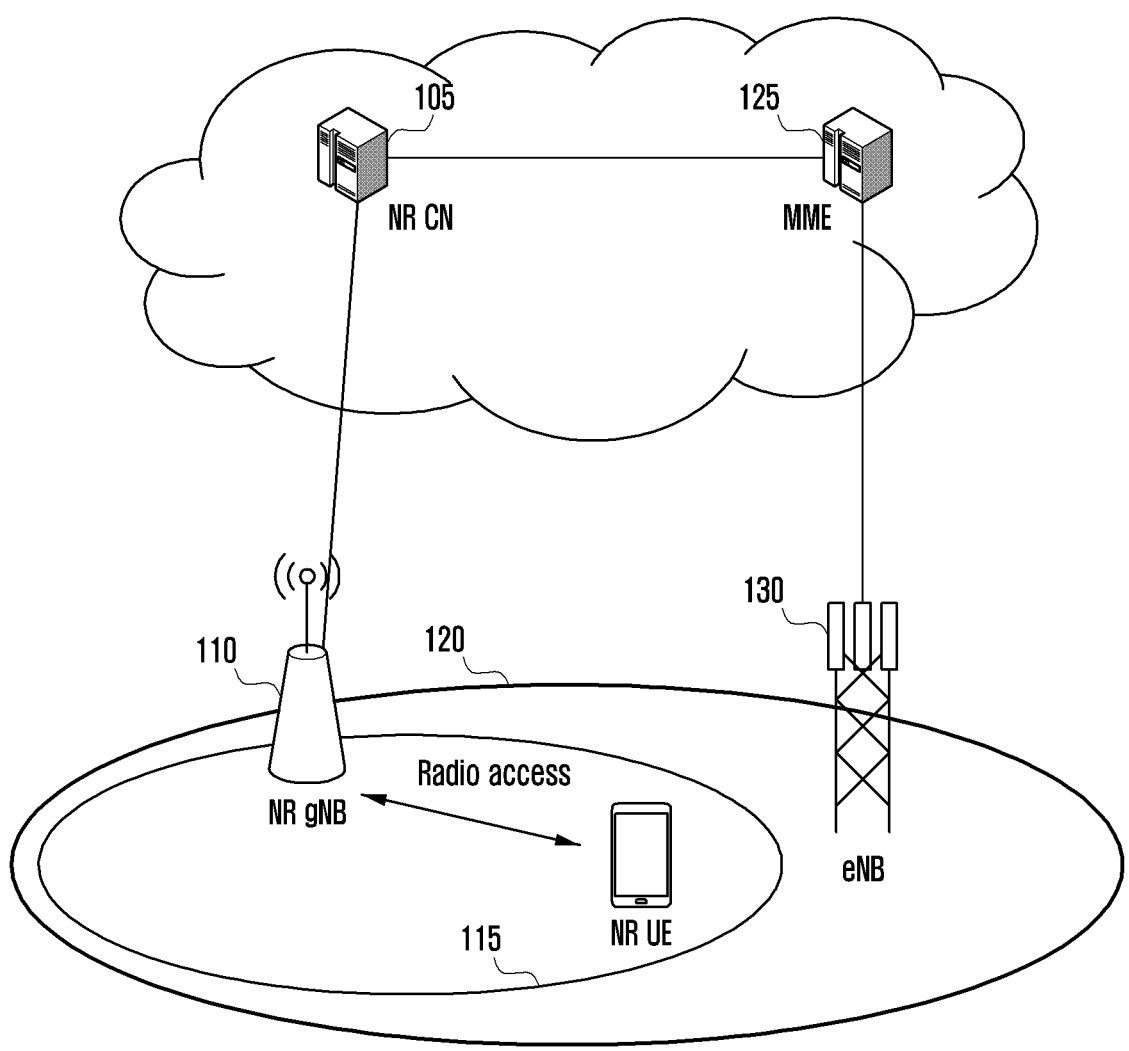
FIG. 1 is a diagram illustrating a structure of a next-generation mobile communication system according to an embodiment of the disclosure.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational operations are performed on the computer or other programmable data processing equipment to generate a computer-executed process; thus, instructions for performing a computer or other programmable data processing equipment may provide operations for performing functions described in the message flow diagram block(s).

Further, each block may represent a module, a segment, or a portion of a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be formed to reside in an addressable storage medium or may be formed to reproduce one or more processors. Therefore, according to some embodiments, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, according to some embodiments, '-unit' may include one or more processors.

Hereinafter, an operating principle of the disclosure will be described in detail with reference to the accompanying drawings. In the following description, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and providers. Therefore, the definition should be made based on the content throughout this specification. Hereinafter, a base station is a subject performing resource allocation of a terminal, and may be at least one of a gNode B, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. The disclosure is not limited to the above examples. Hereinafter, the disclosure describes technology for a terminal to receive broadcast information from a base station in a wireless communication system. The disclosure relates to a communication technique that converges a 5th generation (5G) communication system for supporting higher data rates after a 4th generation (4G) system with Internet of Things (IoT) technology, and a system thereof. The disclosure may be applied to intelligent services (e.g., smart home, smart building, smart city, smart car or connected car, healthcare, digital education, retail business, security and safety-related services and the like) based on 5G communication technology and IoT-related technology.

A term indicating broadcast information used in the following description, a term indicating control information, a term related to communication coverage, a term (e.g., event) indicating a state change, a term indicating network entities, a term indicating messages, and a term indicating a component of a device and the like are exemplified for convenience of description. Accordingly, the disclosure is not limited to the terms described below, and other terms having equivalent technical meanings may be used.

Hereinafter, for convenience of description, some terms and names defined in the 3rd generation partnership project long term evolution (3GPP LTE) standard may be used. However, the disclosure is not limited by the above terms and names, and may be equally applied to systems conforming to other standards.

FIG. 1 is a diagram illustrating a structure of a next-generation mobile communication system according to an embodiment of the disclosure.

With reference to FIG. 1, a radio access network of a next-generation mobile communication system (hereinafter, NR or 5 g) may include a new radio node B (hereinafter, NR gNB or NR base station) 110 and a new radio core network (NR CN) 105. A new radio user equipment (NR UE or terminal) 115 may access an external network through the NR gNB 110 and the NR CN 105.

In FIG. 1, the NR gNB 110 may correspond to an evolved node B (eNB) of the existing LTE system. The NR gNB may be connected to the NR UE 115 through a radio channel and provide a service superior to that of the existing Node B. In the NR, all user traffic may be serviced through a shared channel. Therefore, a device for collecting and scheduling status information such as a buffer status, available transmission power status, and channel status of UEs is required, and the NR gNB 110 may be responsible for this. One NR gNB may control multiple cells. In a NR, a bandwidth greater than or equal to the current maximum bandwidth may be applied to implement ultra-high-speed data transmission compared to current LTE. Further, beamforming technology may be additionally grafted by using orthogonal frequency division multiplexing (OFDM) as a radio access technology. Further, an adaptive modulation & coding (hereinafter, referred to as AMC) scheme for determining a modulation scheme and a channel coding rate according to a channel state of the UE may be applied.

The NR CN 105 may perform functions such as mobility support, bearer configuration, and QoS configuration. The NR CN is a device in charge of various control functions as well as a mobility management function for the UE, and may be connected to a plurality of base stations. Further, the NR may be interworked with the existing LTE system, and the NR CN may be connected to an MME 125 through a network interface. The MME may be connected to an eNB 130, which is the existing base station.

Figure 2:
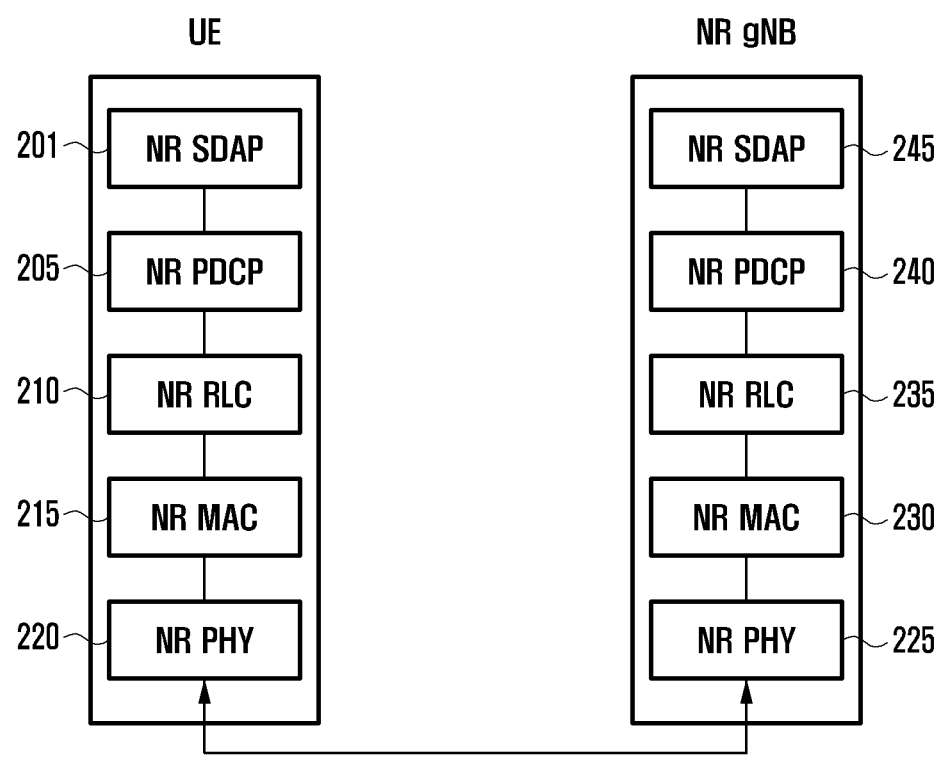
FIG. 2 is a block diagram illustrating a radio protocol structure of a next-generation mobile communication system according to an embodiment of the disclosure.

FIG. 2 is a block diagram illustrating a radio protocol structure of a NR according to an embodiment of the disclosure.

With reference to FIG. 2, the radio protocol of the NR may include NR service data adaptation protocols (SDAPs) 201 and 245, NR PDCPs 205 and 240, NR RLCs 210 and 235, NR MACs 215 and 230, and NR PHYs 220 and 225 in the UE and the NR base station, respectively.

Main functions of the NR SDAPs 201 and 245 may include some of the following functions.
  transfer of user plane data
  mapping between a QoS flow and a DRB for both DL and UL
  marking QoS flow ID in both DL and UL packets
  reflective QoS flow to DRB mapping for the UL SDAP PDUs.

For the SDAP layer device, the UE may receive a configuration on whether to use a header of the SDAP layer device for each PDCP layer device, for each bearer, or for each logical channel with a radio resource control (RRC) message or whether to use a function of the SDAP layer device. When the SDAP header is configured, the UE may instruct to update or reconfigure mapping information on uplink and downlink QoS flows and data bearers with a non-access stratum (NAS) quality of service (QoS) reflection configuration 1-bit indicator (NAS reflective QoS) of the SDAP header and an access stratum (AS) QoS reflection configuration 1-bit indicator (AS reflective QoS) thereof. The SDAP header may include QoS flow ID information indicating a QoS. The QoS information may be used as a data processing priority, scheduling information, and the like for supporting a smooth service.

Main functions of the NR PDCPs 205 and 240 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception Duplicate detection of lower layer SDUs
Retransmission of PDCP SDUs
Ciphering and deciphering
Timer-based SDU discard in uplink.

In the above description, reordering of the NR PDCP device may mean a function of sequentially reordering PDCP PDUs received from a lower layer based on a PDCP sequence number (SN). Reordering of the NR PDCP device may include a function of delivering data to a higher layer in the rearranged order, and include a function of directly delivering data without considering the order, a function of recording lost PDCP PDUs by rearranging the order, a function of reporting a status on the lost PDCP PDUs to the transmitting side, and a function of requesting retransmission of the lost PDCP PDUs.

Main functions of the NR RLCs 210 and 235 may include some of the following functions.
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, in-sequence delivery of the NR RLC device may mean a function of sequentially delivering RLC SDUs received from a lower layer to a higher layer. In embodiments where one RLC SDU is originally divided into several RLC SDUs and received, in-sequence delivery of the NR RLC device may include a function of reassembling and delivering the several RLC SDUs.

In-sequence delivery of the NR RLC device may include a function of rearranging received RLC PDUs based on an RLC sequence number (SN) or a PDCP sequence number (SN), and include a function of recording lost RLC PDUs by rearranging the order, a function of reporting a status on the lost RLC PDUs to the transmitting side, and a function of requesting retransmission of the lost RLC PDUs.

When there is a lost RLC SDU, in-sequence delivery of the NR RLC devices 210 and 235 may include a function of sequentially delivering only RLC SDUs before the lost RLC SDU to a higher layer. Further, even if there is a lost RLC SDU, if a predetermined timer expires, in-sequence delivery of the NR RLC device may include a function of sequentially delivering all RLC SDUs received before the timer starts to a higher layer. Further, even if there is a lost RLC SDU, if a predetermined timer expires, in-sequence delivery of the NR RLC device may include a function of sequentially delivering all RLC SDUs received so far to a higher layer.

The NR RLCs 210 and 235 may process RLC PDUs in the order in which they are received and deliver the RLC PDUs to the NR PDCPs 205 and 240 out of sequence delivery.

When the NR RLC devices 210 and 235 receive a segment, the NR RLC devices 210 and 235 may receive segments stored in a buffer or to be received later, reconstitutes the segments into one complete RLC PDU, and then deliver the one complete RLC PDU to the NR PDCP device.

The NR RLC layer may not include a concatenation function, and may perform a function in the NR MAC layer or may be replaced with a multiplexing function of the NR MAC layer.

In the above description, out-of-sequence delivery of the NR RLC device may mean a function of directly delivering RLC SDUs received from a lower layer to a higher layer regardless of order. When one RLC SDU is originally divided into several RLC SDUs and received, out-of-sequence delivery of the NR RLC device may include a function of reassembling and delivering several RLC SDUs. Out of sequence delivery of the NR RLC device may include a function of storing an RLC SN or PDCP SN of the received RLC PDUs and arranging the order thereof to record lost RLC PDUs.

The NR MACs 215 and 230 may be connected to several NR RLC layer devices formed in one UE, and main functions of the NR MAC may include some of the following functions.
Mapping between logical channels and transport channels
Multiplexing/demultiplexing of MAC SDUs
Scheduling information reporting
Error correction through HARQ(hybrid automatic repeat request)
Priority handling between logical channels of one UE
Priority handling between UEs by means of dynamic scheduling
MBMS service identification
Transport format selection
Padding The NR PHY layers 220 and 225 may perform an operation of channel-coding and modulating upper layer data, making the upper layer data into an OFDM symbol and transmitting the OFDM symbol to a radio channel, or demodulating the OFDM symbol received through the radio channel, decoding the channel, and delivering the OFDM symbol to the upper layer.

Figure 3:
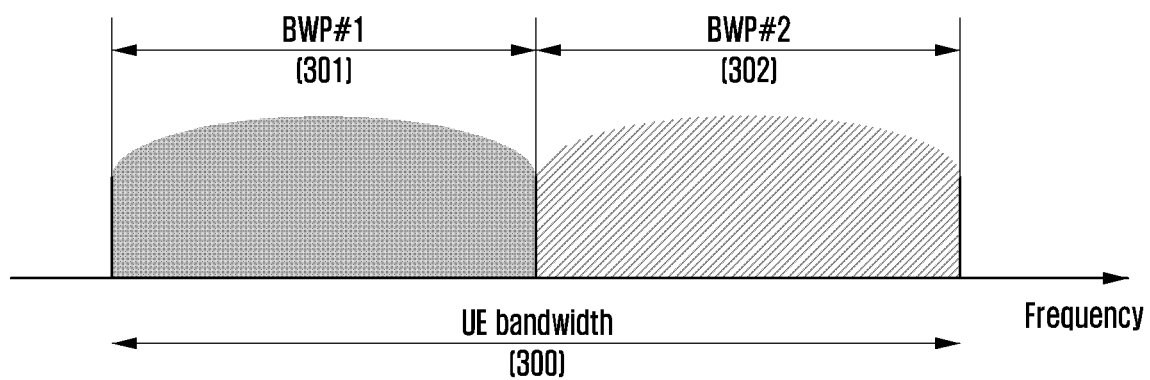
FIG. 3 is a diagram illustrating an example of a configuration for a bandwidth part (BWP) in a 5G communication system to which the disclosure may be applied.

FIG. 3 is a diagram illustrating an example of a configuration for a bandwidth part (BWP) in a 5G communication system to which the disclosure may be applied.

In a next-generation mobile communication system (5G, NR), at least one downlink (DL) BWP and at least one uplink (UL) BWP for each serving cell may be configured to the UE. One of the configured downlink BWPs may operate as an active DL BWP at one time point, and the UE may receive data through the active DL BWP. Further, one of the configured uplink BWPs operates as an active UL BWP at one time point; thus, the UE may transmit data through the active UL BWP.

FIG. 3 illustrates an example in which a UE bandwidth 300 is configured as two BWPs, that is, a BWP #1, 301 and a BWP #2, 302. The base station may configure one or a plurality of BWPs to the UE, and configure, for example, the following information for each BWP.

TABLE 1

Configuration information 1. Bandwidth of BWP (the number of PRBs constituting the bandwidth part)
Configuration information 2. Frequency position of BWP (Offset value compared to a reference point, the reference point may be, for example, a center frequency of a carrier wave, a synchronization signal, synchronization signal raster, and the like)
Configuration information 3. Numerology of the bandwidth part (e.g., subcarrier spacing, cyclic prefix (CP) length, and the like)-etc.

In addition to the configuration information, various parameters related to a BWP may be configured to the UE. The information may be transmitted by the base station to the UE through higher layer signaling, for example, RRC signaling. At least one BWP of the configured one or a plurality of BWPs may be activated. Whether to activate the configured BWP may be semi-statically transmitted from the base station to the UE through RRC signaling or may be dynamically transmitted through a MAC control element (MAC CE) or downlink control information (DCI).

According to an embodiment, the UE before radio resource control (RRC) connection may receive a configuration of an initial bandwidth part (initial BWP) for initial access from the base station through a master information block (MIB). More specifically, in order for the UE to receive system information (may correspond to remaining system information (RMSI) or system information block 1 (SIB1)) necessary for initial access through the MIB in an initial access operation, the UE may receive configuration information on a search space and a control resource set (CORESET) to which the PDCCH may be transmitted. The CORESET and the search space configured by the MIB may be regarded as an identity (ID) 0, respectively.

The base station may notify the UE of configuration information such as frequency allocation information, time allocation information, and numerology on a CORESET #0 through the MIB. Further, the base station may notify the UE of configuration information on a monitoring period and occasion for the CORESET #0, that is, configuration information on a search space #0 through the MIB. The UE may regard a frequency domain configured as the CORESET #0 obtained from the MIB as an initial bandwidth part for initial access. In this case, an identity (ID) of the initial bandwidth part may be regarded as 0.

A configuration for the BWP supported by the NR may be used for various purposes. For example, in embodiments where a bandwidth supported by the UE is smaller than a system bandwidth, this may be supported through the BWP configuration. For example, by configuring a frequency position (configuration information 2) of the BWP in the table to the UE, the UE may transmit and receive data at a specific frequency location within the system bandwidth.

As another example, the base station may configure a plurality of BWPs to the UE for the purpose of supporting different numerologies. For example, in order to support both data transmission and reception using subcarrier spacing of 15 kHz and subcarrier spacing of 30 kHz to a certain UE, two bandwidth parts may be configured to subcarrier spacing of 15 kHz and 30 kHz, respectively. Different bandwidth parts may be frequency division multiplexed, and in embodiments where data is to be transmitted and received at specific subcarrier spacing, a BWP configured to the corresponding subcarrier spacing may be activated.

As another example, for the purpose of reducing power consumption of the UE, the base station may configure a BWP having different sizes of bandwidths to the UE. For example, in the case that the UE supports a very large bandwidth, for example, a bandwidth of 100 MHz and always transmits and receives data using the corresponding bandwidth, very large power consumption may be caused. In particular, in the absence of traffic, monitoring an unnecessary downlink control channel with a large bandwidth of 100 MHz is very inefficient in terms of power consumption. For the purpose of reducing power consumption of the UE, the base station may configure a BWP of a relatively small bandwidth, for example, a BWP of 20 MHz to the UE. In the absence of traffic, the UE may perform a monitoring operation at 20 MHz BWP, and in the case that data is generated, the UE may transmit and receive data at a BWP of 100 MHz according to the instruction of the base station.

In the above-described method of configuring the bandwidth part, UEs before RRC connection may receive configuration information on an initial bandwidth part through a master information block (MIB) in an initial connection operation. More specifically, the UE may receive a configuration of a control resource set (CORESET) for a downlink control channel in which downlink control information (DCI) scheduling a system information block (SIB) may be transmitted from an MIB of a physical broadcast channel (PBCH). A bandwidth of the CORESET configured to the MIB may be regarded as an initial bandwidth part, and the UE may receive a PDSCH to which the SIB is transmitted through the configured initial bandwidth part. In addition to the purpose of receiving the SIB, the initial bandwidth part may be utilized for other system information (OSI), paging, and random access.

Figure 4:
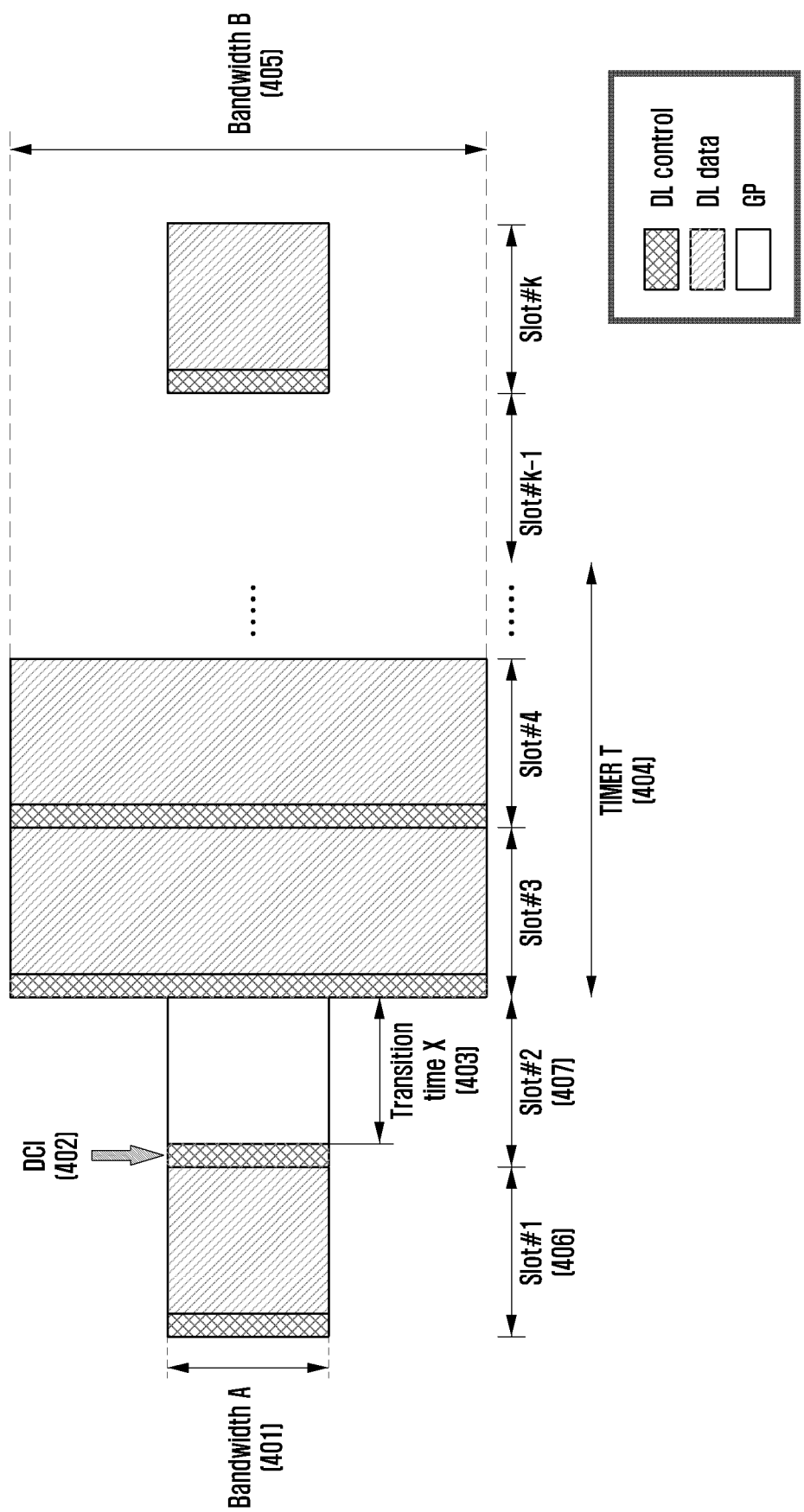
FIG. 4 is a diagram illustrating a method of efficiently managing terminal power consumption through BWP adjustment according to an embodiment of the disclosure.

FIG. 4 is a diagram illustrating a method of efficiently managing UE power consumption through BWP adjustment according to an embodiment of the disclosure.

In FIG. 4, a horizontal axis represents a time domain, and a vertical axis represents a frequency domain.

With reference to FIG. 4, the UE may transmit and receive data to and from the base station through a BWP A 401 in a slot #1, 406 section. The BWP A may be a predetermined reference bandwidth, a BWP determined upon initial access of the UE, or a BWP determined through a configuration of the base station. For example, the BWP A may include at least one of an initial BWP received through system information for initial connection of the UE, a BWP activated through an RRC configuration of the base station, or a default BWP, which is a BWP in which the UE falls back due to expiration of a BWP timer.

The base station may change an activation BWP of the UE. For example, the UE may monitor a control channel through a narrow BWP, and receive the packet at a wider BWP in the case that a large capacity packet is scheduled.

Therefore, in a slot #2, 407, by transmitting DCI 402 including a BWP indicator, the base station may instruct the UE to switch to an indicated BWP B 405. As described above, the base station may configure a plurality of BWPs to the UE through an RRC message, and in the case of switching BWPs, the base station may indicate any one of the configured BWPs through a BWP indicator included in DCI, and the UE may perform switching to the indicated BWP. In this case, the number of bits of the BWP indicator included in DCI may be determined according to the number of BWPs configured by the base station, and the BWP indicator may be configured up to 2 bits.

In the disclosure, BWP switching may mean an operation of deactivating the current BWP and activating the BWP indicated by the BWP.

Further, the UE may start a bwp-inactivetimer (BWP inactivity timer, or bwp inactivity timer) together with BWP switching. In embodiments where the bwp-inactivetimer expires, the UE may fall back to a default BWP (404).

The default BWP may be configured to the UE through an RRC message, and in embodiments where the default BWP is not configured, when the bwp-inactivetimer expires, the UE may fall back to an initial BWP.

A predetermined time 403 may be required for the UE to acquire BWP switching after receiving the DCI. This may be referred to as a BWP switch delay. The UE may transmit information on BWP switch delay to the UE through UEcapability information, and a BWP switch delay value may be determined according to information transmitted by the UE and a subcarrier spacing value.

Figure 5:
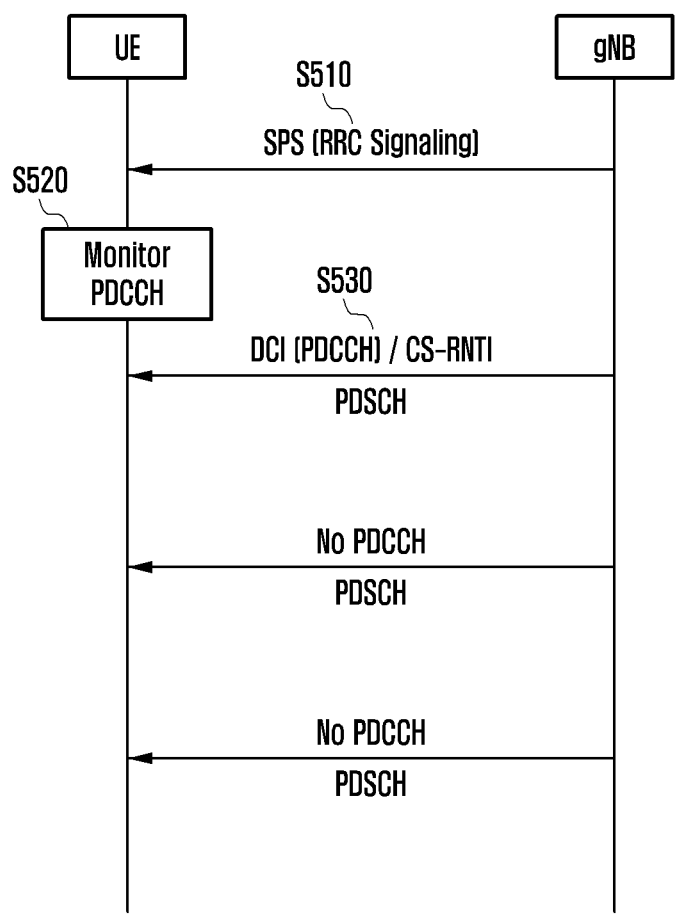
FIG. 5 is a message flow diagram illustrating a terminal operation according to an SPS configuration and a configured grant configuration according to an embodiment of the disclosure.

FIG. 5 is a message flow diagram illustrating a UE operation according to an SPS configuration and a configured grant configuration according to an embodiment of the disclosure.

indicator (NDI) field included in the DCI is 0 and that 'HARQ process number' and 'Redundancy version' fields included in the DCI satisfy Table 2, the UE and the base station may understand that SPS or UL grant type 2 is activated.

TABLE 2

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block set to '00' |

The network may transmit SPS configuration information (SPS-Config) to the UE for semi-persistent downlink transmission (DL SPS) to the UE, and configure at least one parameter to the UE through the SPS configuration information. The SPS configuration information may be included in an RRC message and transmitted. Specifically, a downlink BWP configuration (BWP-Downlink Information Element (IE)) included in the RRC message may include a BWP-DownlinkDedicated IE, and the BWP-DownlinkDedicated IE may include the SPS configuration information (SPS-ConFIG. IE). The SPS may be configured to a SpCell (Special Cell, PCell, PSCell) and an SCell. That is, the SPS configuration information may be configured for each BWP. Further, the network may be configured such that SPS is configured only to maximum one cell of one cell group. Further, a plurality of SPS configuration information may be included in one BWP of the one cell.

Further, the network may transmit a ConfiguredGrantConfig to the UE for semi-persistent uplink transmission to the UE, and configure at least one parameter to the UE through the ConfiguredGrantConfig information. The ConfiguredGrant configuration information may be included in the RRC message and transmitted. Specifically, the uplink BWP configuration (BWP-Uplink information element (IE)) included in the RRC message may include a BWP-UplinkDedicated IE, and the BWP-UplinkDedicated IE may include a ConfiguredGrantConfig IE. Further, a plurality of ConfiguredGrant configuration information may be included in one BWP of one cell.

The ConfiguredGrantConfig may be configured to Type 1 or Type 2, the Type 1 may be controlled only by RRC signaling, and the Type 2 (UL grant type 2) may be controlled through a PDCCH addressed by RRC configuration and configured scheduling (CS)-radio network temporary identifier (RNTI).

In the disclosure, ConfiguredGrant type 2 (UL grant type 2) and SPS configuration activated through the configured scheduling (CS)-radio network temporary identifier (RNTI) may be referred to as semi-static scheduling.

With reference to FIG. 5, the base station may transmit configuration information related to semi-static scheduling (e.g., at least one of SPS configuration information or ConfiguredGrant configuration information) to the UE in operation S510. Period information may be included in the SPS configuration information and ConfiguredGrant configuration information. The UE may monitor a PDCCH in operation S520. The UE may receive DCI transmitted through the PDCCH in operation S530. The UE may identify or determine through 'PDCCH validation' whether the SPS or UL grant type 2 is activated through the DCI.

Specifically, in embodiments where DCI delivered through the PDCCH and an RNTI used for scrambling a CRC of the DCI is a CS-RNTI and that a value of a new data indicator (NDI) field included in the DCI is 0 and that 'HARQ process number' and 'Redundancy version' fields included in the DCI satisfy Table 2, the UE and the base station may understand that SPS or UL grant type 2 is activated.

Accordingly, the UE may receive data from the base station or transmit data to the base station according to a semi-statically scheduled resource.

Figure 6:
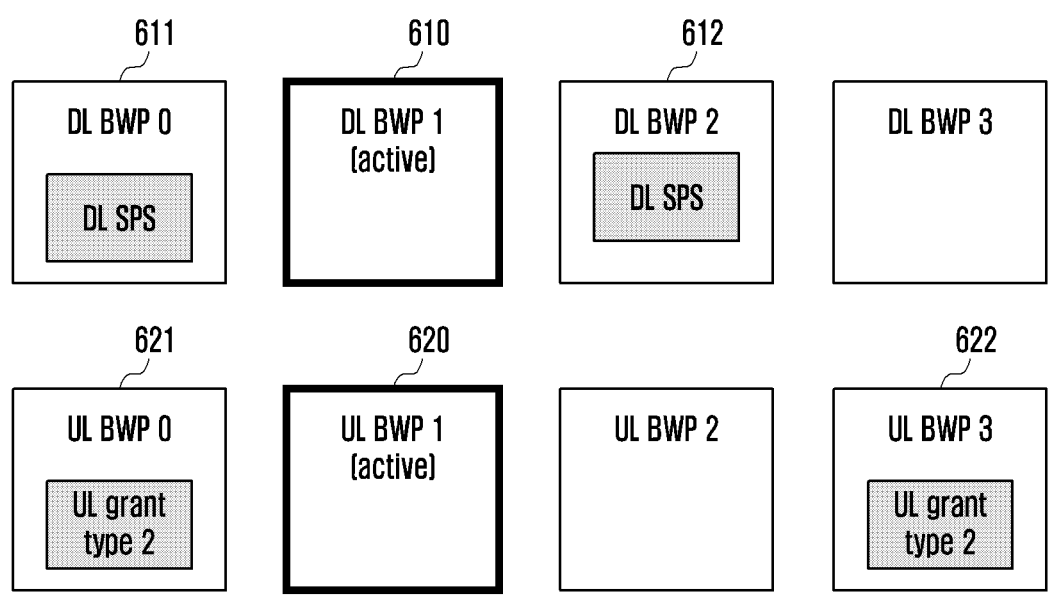
FIG. 6 is a block diagram illustrating an example of a BWP configuration, SPS, and ConfiguredGrant configuration according to an embodiment of the disclosure.

FIG. 6 is a block diagram illustrating an example of a BWP configuration, SPS, and ConfiguredGrant configuration according to an embodiment of the disclosure.

As described above, 1 to 4 DL BWPs and 1 to 4 UL BWPs may be configured in one serving cell. Configuration information of each DL BWP may include SPS-conFIG. IE, and an 'UL grant type 2' may be configured in each UL BWP configuration information through a ConfiguredGrantConfig IE.

FIG. 6 illustrates an exemplary embodiment where 4 DL BWPs and 4 UL BWPs are configured to one serving cell and that an active DL BWP is a DL BWP 1, 610 and that an active UL BWP is a UL BWP 1, 620. A state in which DL SPS is configured in a DL BWP 0, 611 and a DL BWP 2, 612 through an SPS-config. DL IE, and in which an UL grant type 2 is configured in an UL BWP 0, 621 and a UL BWP 3, 622 through a ConfiguredGrantConfig IE is illustrated.

Case 1) The UE may monitor a PDCCH in an active DL BWP (DL BWP 1). The UE may receive DCI of a DCI format 0-0 or a DCI format 1-0 addressed by the configured CS-RNTI and in which a value of an NDI field is 0 and satisfying conditions of Table 2.

In this case, the active DL BWP (DL BWP 1) is a BWP in which SPS is not configured, and in embodiments where DCI for activating the SPS is received, as described above, there is a problem that it is not clear how the UE should operate.

Case 2) Further, the UE may monitor a PDCCH in the active DL BWP (DL BWP 1). Alternatively, in embodiments where cross-carrier scheduling is configured, the UE may monitor a PDCCH for the serving cell of FIG. 6 in a scheduling cell. The UE may monitor a PDCCH to receive DCI and receive DCI of a DCI format 0-1 or a DCI format 1-1 addressed by the configured CS-RNTI and in which a value of an NDI field is 0, and satisfying conditions of Table 2. In this case, the DCI format 1-1 may include a 'BWP indicator' field, and the BWP indicator field may indicate a DL BWP 1 or a DL BWP 3. Alternatively, the 'BWP indicator' field included in the DCI format 0-1 may indicate a UL BWP 1 or a UL BWP 2.

In this way, when BWP switching is indicated through the BWP indicator, DCI including the BWP indicator indicates activation of SPS or a ConfiguredGrant, whereas when SPS or a ConfiguredGrant is not configured to a BWP indicated by a BWP indicator, there is a problem that it is not clear how the UE should operate.

Accordingly, the disclosure proposes a method for solving the above problems.

Figure 7:
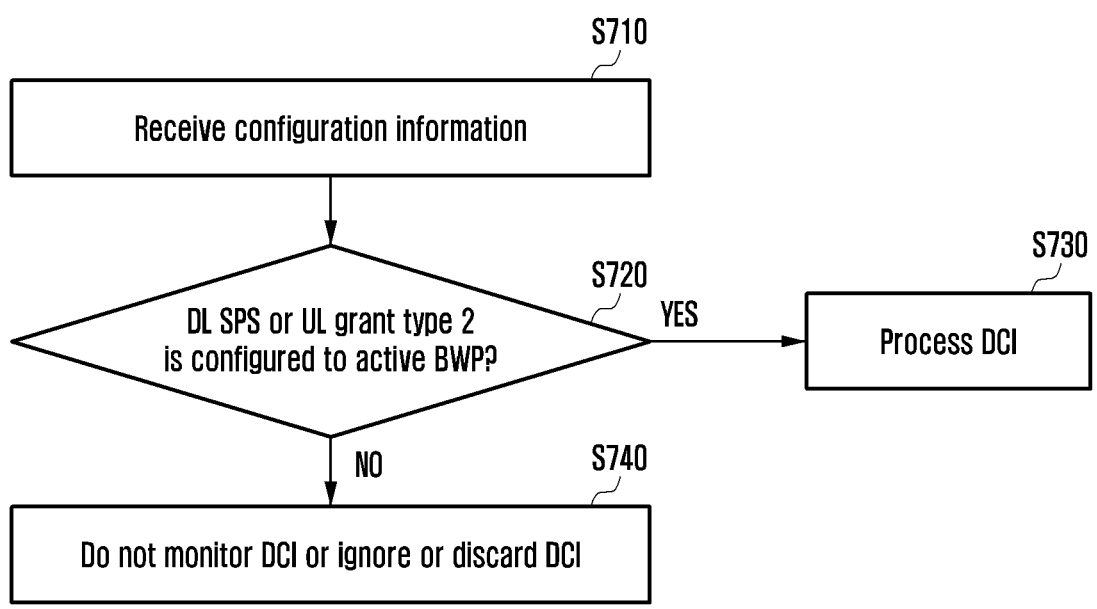
FIG. 7 is a flowchart illustrating an operation of a terminal according to an embodiment of the disclosure.

FIG. 7 is a flowchart illustrating an operation of a UE according to an embodiment of the disclosure.

FIG. 7 illustrates an operation of a UE for solving the problem in the above case 1.

With reference to FIG. 7, the UE may determine whether a DCI format 0-0 or a DCI format 1-0 (in which a CRC of a DCI format is scrambled by a CS-RNTI) addressed by a CS-RNTI is monitored or whether the detected DCI is processed according to whether DL SPS is configured to an active DL BWP or an 'UL grant type 2 is configured to an active UL BWP'.

Specifically, the UE may receive configuration information related to semi-static scheduling (e.g., at least one of SPS configuration information or ConfiguredGrant configuration information) in operation S710. A detailed description of the configuration information is the same as that described above, and will be omitted below.

The UE may identify or determine whether semi-static scheduling is configured to the active BWP in operation S720. That is, the UE may identify or determine whether SPS is configured to the active BWP or an UL grant type 2 is configured to the active BWP.

In embodiments where semi-static scheduling is configured to the active BWP, the UE may monitor DCI addressed by a CS-RNTI in operation S730. Specifically, according to an embodiment, the UE may monitor a DCI format 1-0 addressed by a CS-RNTI (in which a CRC of a DCI format is scrambled by the CS-RNTI) in an active DL BWP to which SPS (SPS-conFIG. IE) is configured. Alternatively, in embodiments where a ConfiguredGrantConfig IE is configured to the active UL BWP, the UE may monitor a DCI format 0-0 addressed by a CS-RNTI (in which a CRC of a DCI format is scrambled by the CS-RNTI).

In embodiments where DCI is detected, the UE may transmit or receive data based on the DCI. In embodiments where the DCI is addressed by a CS-RNTI and that an NDI field value is 0 and that a 'HARQ process number' field and a 'Redundancy version' field satisfy conditions of Table 2 (i.e., in embodiments where semi-static scheduling is activated), the UE may transmit or receive data based on configuration information (SPS config or ConfiguredGrantconfig) on semi-static scheduling and the DCI.

In embodiments where semi-static scheduling is not configured to the active BWP, the UE may not monitor DCI addressed by a CS-RNTI in operation S740. Alternatively, the UE monitors the DCI, but in embodiments where the detected DCI is DCI addressed by a CS-RNTI (or in embodiments where the detected DCI is DCI for activating semi-static scheduling), the UE may ignore or discard the DCI without processing.

Specifically, the UE may not monitor a DCI format 1-0 addressed by a CS-RNTI (in which a CRC of a DCI format is scrambled by the CS-RNTI) in an active DL BWP to which SPS is not configured. Alternatively, the UE may ignore or discard a DCI format 1-0 addressed by the detected CS-RNTI (in which a CRC of a DCI format is scrambled by the CS-RNTI) without processing. Further, in embodiments where a ConfiguredGrant is not configured to the active UL BWP, the UE may not monitor a DCI format 0-0 addressed by a CS-RNTI (in which a CRC of a DCI format is scrambled by the CS-RNTI). Alternatively, the UE may ignore or discard a DCI format 0-0 addressed by the detected CS-RNTI (in which a CRC of a DCI format is scrambled by the CS-RNTI) without processing.

Figure 8:
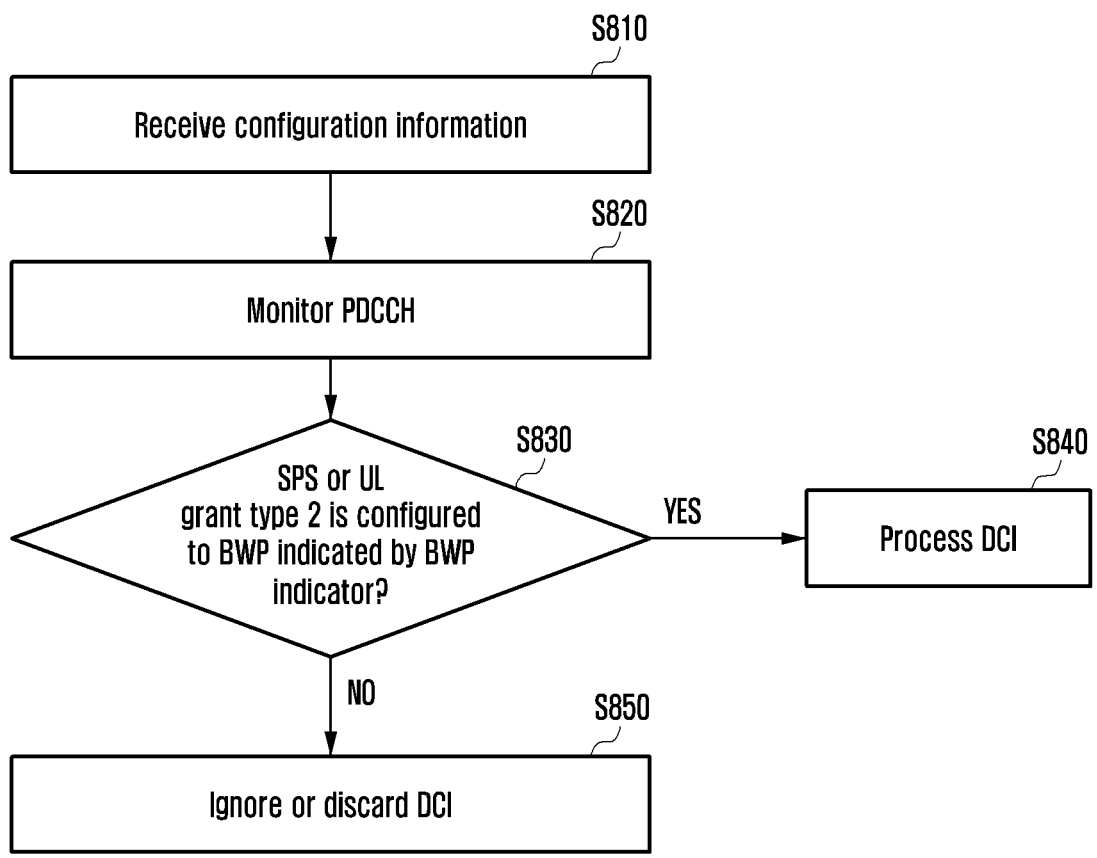
FIG. 8 is a flowchart illustrating an operation of a terminal according to an embodiment of the disclosure.

FIG. 8 is a flowchart illustrating an operation of a UE according to an embodiment of the disclosure.

FIG. 8 illustrates an operation of a UE for solving the problem in the case 2.

With reference to FIG. 8, the UE may receive configuration information related to semi-static scheduling (e.g., at least one of SPS configuration information or ConfiguredGrant configuration information) in operation S810. A detailed description of the configuration information is the same as that described above. Further, the configuration information related to semi-static scheduling may be included in an RRC message and transmitted, and the RRC message may include configuration information for BWP switching. A description of configuration information for BWP switching is the same as that described above, and a detailed description thereof is omitted.

The UE may monitor a PDCCH in operation S820. Specifically, the UE may monitor a DCI format 1-1 or a DCI format 0-1 addressed by a CS-RNTI (a CRC of DCI format is scrambled by a CS-RNTI) regardless of whether DL SPS is configured to the active DL BWP or an UL grant type 2 is configured to an active UL BWP.

According to an embodiment of the disclosure, when a DCI format 1-1 or a DCI format 0-1 detected as the monitoring result is addressed by a CS-RNTI (in which a CRC of a DCI format is scrambled by the CS-RNTI), and that a value of an NDI field is 0 and that a 'HARQ process number' field and a 'Redundancy version' field satisfy conditions of Table 2, the UE may determine whether to process the detected DCI according to whether DL SPS or an UL grant type 2 is configured to a BWP indicated by a BWP indicator field of the detected DCI format 1-1 or DCI format 0-1. In the disclosure, the case of being addressed by a CS-RNTI (in which a CRC of a DCI format is scrambled by the CS-RNTI) and that a value of an NDI field is 0 and that a 'HARQ process number' field and a 'Redundancy version' field satisfy conditions of Table 2 may be referred to as the case that semi-static scheduling is activated (or the case that SPS or an UL grant type 2 is activated).

Accordingly, the UE may receive DCI as the monitoring result, and identify or determine whether the DCI activates semi-static scheduling (or whether a condition for activation is satisfied). A process of identifying or determining whether semi-static scheduling is activated may be included in a process of receiving DCI.

In operation S830, the UE may identify or determine whether semi-static scheduling is configured to a BWP indicated by a BWP indicator included in the DCI (whether SPS is configured or an UL grant type2 is configured).

According to an embodiment of the disclosure, when the detected DCI format 1-1 is addressed by a CS-RNTI (in which a CRC of a DCI format is scrambled by the CS-RNTI), a value of an NDI field is 0, and a 'HARQ process number' field and a 'Redundancy version' field satisfy conditions of Table 2, and there is a DL SPS configuration in a BWP indicated by a BWP indicator field of the detected DCI format 1-1, the UE may change an active DL BWP to the corresponding BWP and determine that the DL SPS is activated to receive data through a PDSCH according to SPS configuration information (SPS-conFIG. IE) in operation S840.

Because a BWP switching operation according to the BWP indicator is the same as that described above, the operation of the drawing may be performed in combination with the above-described BWP switching operation. A detailed description thereof is omitted.

Alternatively, in embodiments where the detected DCI format 0-1 is addressed by a CS-RNTI (in which a CRC of a DCI format is scrambled by the CS-RNTI) and that a value of an NDI field is 0 and that a 'HARQ process number' field and a 'Redundancy version' field satisfy conditions of Table 2, if there is a UL grant type 2 configuration in a BWP indicated by a BWP indicator field of the detected DCI format 0-1, the UE may change an active UL BWP to the corresponding BWP and determine that a UL grant type 2 is activated to transmit data through a PUSCH according to ConfiguredGrant configuration information (Config-uredGrantConfig IE).

If a DL SPS configuration does not exist in a BWP indicated by a BWP indicator field of the detected DCI format 1-1, the UE may maintain the active DL BWP (i.e., does not perform BWP switching) and ignore or discard the DCI format 1-1 without processing in operation S850. Further, if an UL grant type 2 configuration does not exist in a BWP indicated by a BWP indicator field of the detected DCI format 0-1, the UE may maintain the current UL BWP to the active UL BWP and ignore or discard the DCI format 0-1 without processing.

Figure 9:
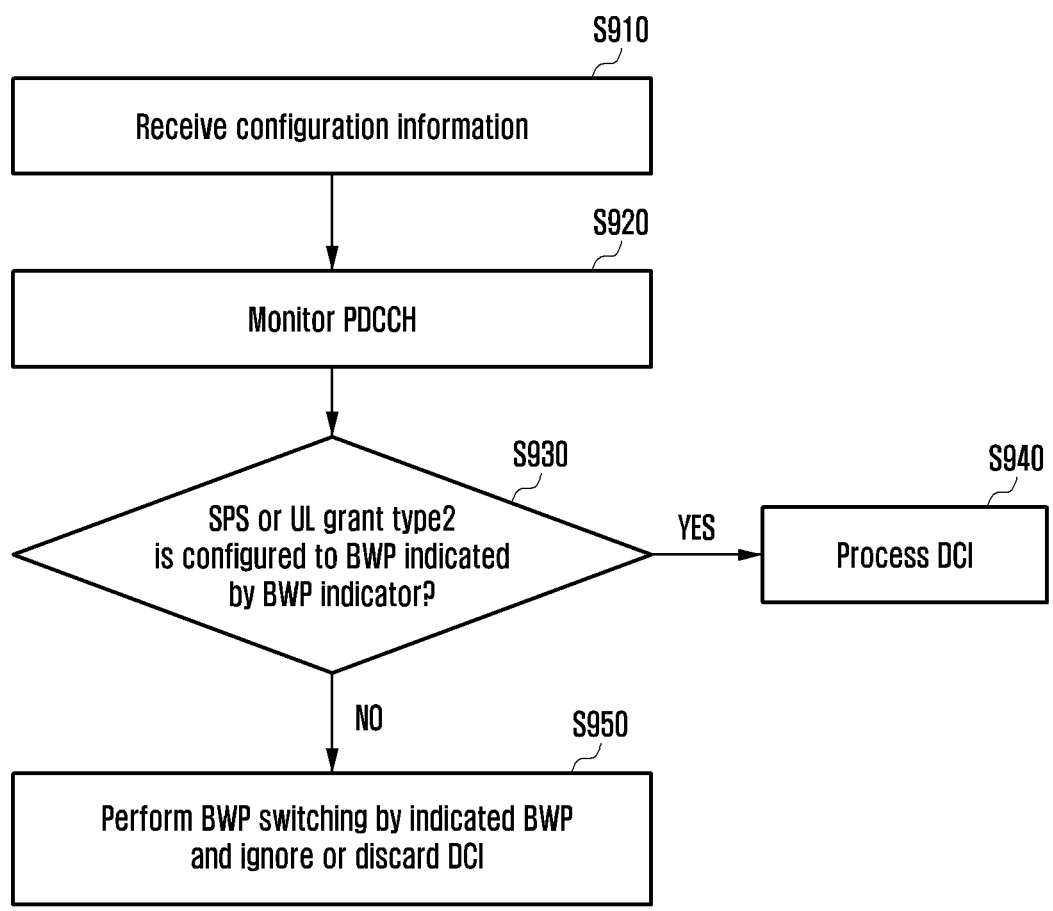
FIG. 9 is a flowchart illustrating an operation of a terminal according to an embodiment of the disclosure.

FIG. 9 is a flowchart illustrating an operation of a UE according to an embodiment of the disclosure.

FIG. 9 illustrates another operation of the UE for solving the problem in the above case 2.

With reference to FIG. 9, the UE may receive configuration information related to semi-static scheduling (e.g., at least one of SPS configuration information or Config-uredGrant configuration information) in operation S910. A detailed description of the configuration information is the same as that described above. Further, the configuration information related to the semi-static scheduling may be included in an RRC message and transmitted, and the RRC message may include configuration information for BWP switching. A description of configuration information for BWP switching is the same as that described above, and a detailed description thereof is omitted.

The UE may monitor a PDCCH in operation S920. Specifically, the UE may monitor a DCI format 1-1 or a DCI format 0-1 addressed by a CS-RNTI (in which a CRC of a DCI format is scrambled by the CS-RNTI) regardless of whether DL SPS is configured to an active DL BWP or an UL grant type 2 is configured to an active UL BWP.

As the monitoring result, the UE may receive DCI, and identify or determine whether the DCI activates semi-static scheduling (or whether a condition for activation is satisfied). A process of identifying or determining whether semi-static scheduling is activated may be included in a process of receiving DCI.

In operation S930, the UE may identify or determine whether semi-static scheduling is configured to a BWP indicated by a BWP indicator included in the DCI (whether SPS is configured or an UL grant type2 is configured).

In embodiments where the detected DCI format 1-1 is addressed by a CS-RNTI (in which a CRC of a DCI format is scrambled by the CS-RNTI) and that a value of an NDI field is 0 and that a 'HARQ process number' field and a 'Redundancy version' field satisfy conditions of Table 2, when there is a DL SPS configuration in a BWP indicated by a BWP indicator field of the detected DCI format 1-1, the UE may change the active DL BWP to the corresponding BWP and determine that the DL SPS is activated to receive data through a PDSCH according to SPS configuration information (SPS-conFIG. IE) in operation S940.

Further, in embodiments where the detected DCI format 0-1 is addressed by a CS-RNTI (in which a CRC of a DCI format is scrambled by the CS-RNTI) and that a value of an NDI field is 0 and that a 'HARQ process number' field and a 'Redundancy version' field satisfy conditions of Table 2, when an UL grant type 2 configuration exists in a BWP indicated by a BWP indicator field of the detected DCI format 0-1, the UE may change the active UL BWP to the corresponding BWP and determine that an UL grant type 2 is activated to transmit data through a PUSCH according to ConfiguredGrant configuration information (Config-uredGrantConfig).

If a DL SPS configuration does not exist in a BWP indicated by a BWP indicator field of the detected DCI format 1-1, the UE may change an active DL BWP to a BWP indicated by a BWP indicator field of the detected DCI format 1-1 and ignore or discard DL SPS-related contents without processing in operation S950.

Further, if an 'UL grant type 2 configuration' does not exist in the BWP indicated by the 'Bandwidth part indicator' field of the detected DCI format 0-1, the UE may change the active UL BWP to the BWP indicated by the 'Bandwidth part indicator' field of the detected DCI format 0-1, and ignore or discard the 'UL grant type 2' related content without processing.

That is, in this embodiment, in embodiments where semi-static scheduling is activated, the UE may change the active BWP to a BWP indicated by a BWP indicator field regardless of whether semi-static scheduling is configured to a BWP indicated by the BWP indicator field included in the DCI. Because a BWP switching operation according to the BWP indicator is the same as that described above, the operation of the drawing may be performed in combination with the above-described BWP switching operation. A detailed description thereof is omitted.

Figure 10:
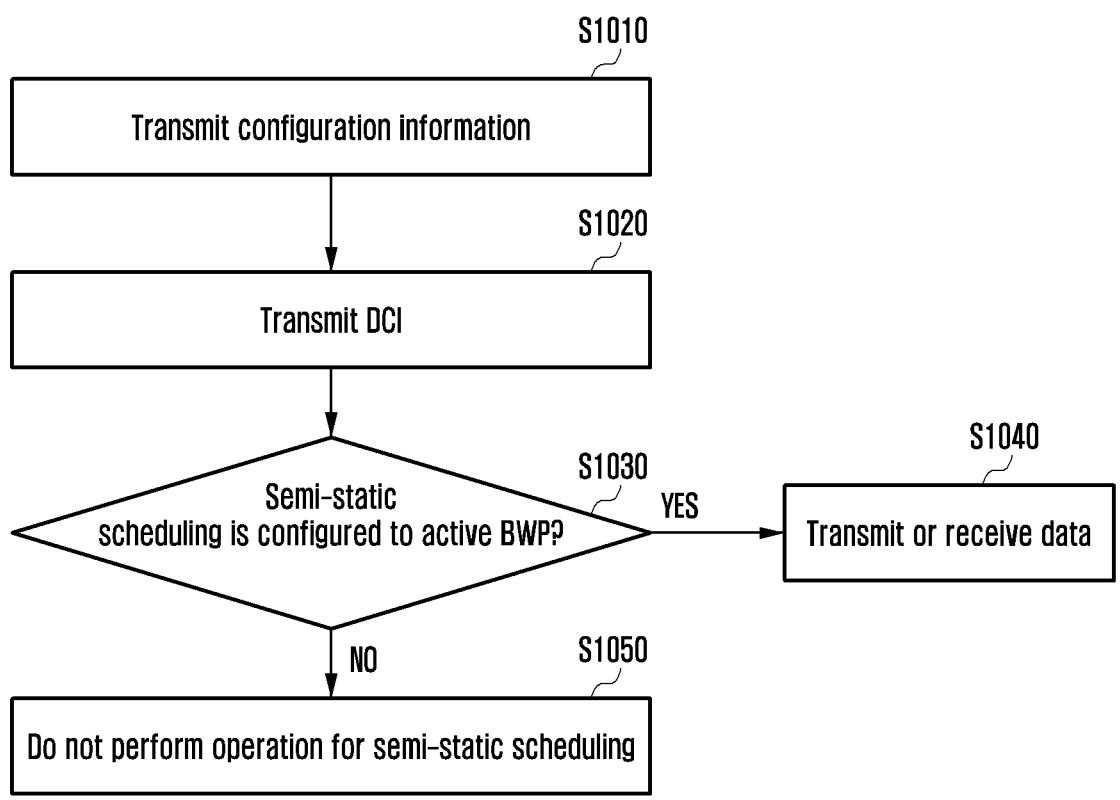
FIG. 10 is a flowchart illustrating an operation of a base station according to an embodiment of the disclosure.

FIG. 10 is a flowchart illustrating an operation of a base station according to an embodiment of the disclosure.

With reference to FIG. 10, the base station may transmit configuration information related to semi-static scheduling (e.g., at least one of SPS configuration information or ConfiguredGrant configuration information) to the UE in operation S1010. A detailed description of the configuration information is the same as that described above. Further, the configuration information related to semi-static scheduling may be included in an RRC message and transmitted, and the RRC message may include configuration information for BWP switching. A description of configuration information for BWP switching is the same as that described above, and a detailed content thereof is omitted.

The base station may transmit DCI in operation S1020. The base station may transmit DCI for dynamic scheduling through a PDCCH.

In embodiments where semi-static scheduling is configured, the base station may transmit DCI for activating semi-static scheduling through the PDCCH.

In semi-static scheduling, activating DCI may be related to DCI formats 0-0 and 1-0. Further, in semi-static scheduling, activating DCI may mean DCI addressed by a CS-RNTI (in which a CRC of a DCI format is scrambled by the CS-RNTI) and in which a value of an NDI field is 0 and in which a 'HARQ process number' field and a 'Redundancy version' field satisfy conditions of Table 2.

In embodiments where the base station activates semi-static scheduling, the base station may identify or determine whether semi-static scheduling is configured to the active BWP in operation S1030.

In embodiments where semi-static scheduling is configured to the active BWP (i.e., in embodiments where SPS or an UL grant type 2 is configured), the base station may transmit or receive data based on DCI and configuration information on semi-static scheduling in the active BWP in operation S1040.

In embodiments where semi-static scheduling is not configured to the active BWP, the base station may not perform an operation for semi-static scheduling in operation S1050. Not performing an operation for semi-static scheduling may be expressed as expecting not to perform an operation for semi-static scheduling or skipping an operation for semi-static scheduling.

Figure 11:
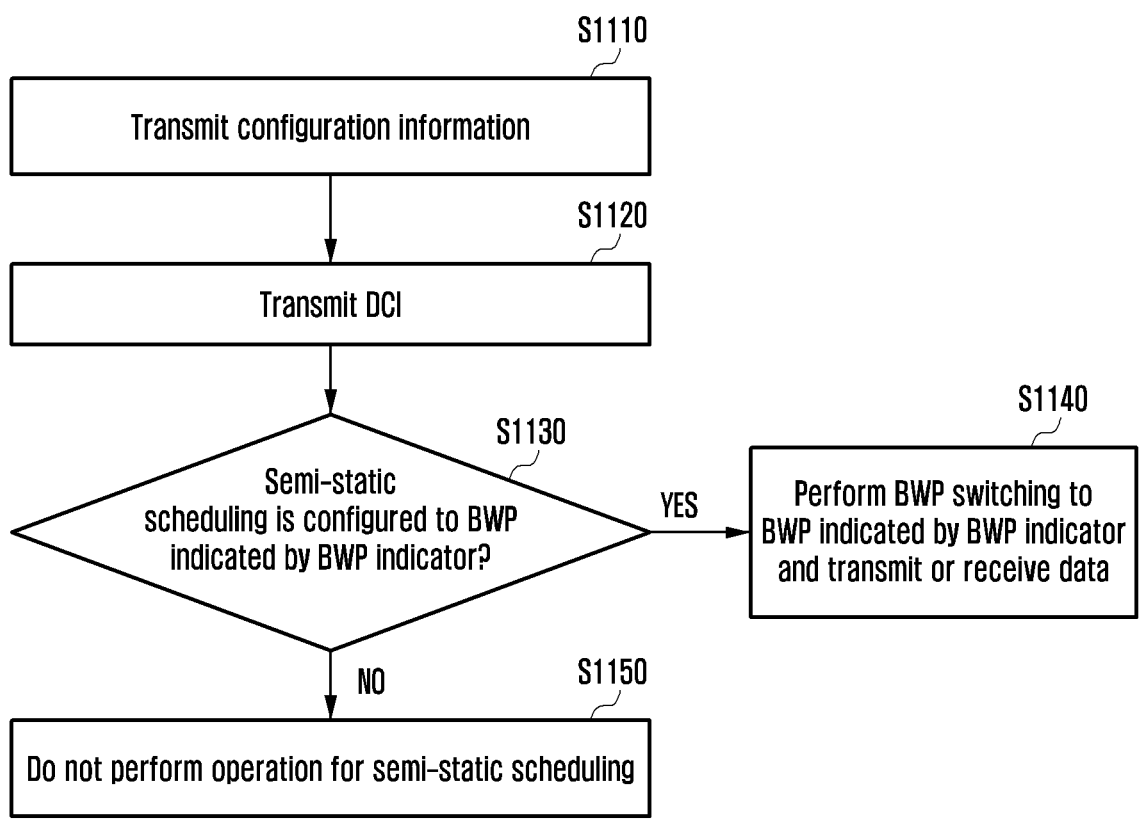
FIG. 11 is a flowchart illustrating an operation of a base station according to an embodiment of the disclosure.

FIG. 11 is a flowchart illustrating another operation of a base station according to an embodiment of the disclosure.

With reference to FIG. 11, the base station may transmit configuration information related to semi-static scheduling (e.g., at least one of SPS configuration information or ConfiguredGrant configuration information) to the UE in operation S1110. A detailed description of the configuration information is the same as that described above. Further, the configuration information related to semi-static scheduling may be included in an RRC message and transmitted, and the RRC message may include configuration information for BWP switching. A description of configuration information for BWP switching is the same as that described above, and a detailed description thereof is omitted.

The base station may transmit DCI in operation S1120. The base station may transmit DCI for dynamic scheduling through a PDCCH.

In embodiments where the semi-static scheduling is configured, the base station may transmit DCI for activating semi-static scheduling through a PDCCH.

In semi-static scheduling, activating DCI may be related to DCI formats 0-1, 1-1, and the like. Further, in semi-static scheduling, activating DCI may mean DCI addressed by a CS-RNTI (in which a CRC of a DCI format is scrambled by the CS-RNTI) and in which a value of an NDI field is 0 and in which a 'HARQ process number' field and a 'Redundancy version' field satisfy conditions of Table 2.

This embodiment exemplifies a case of DCI in which a DCI format including the BWP indicator is 0-1 or 1-1. Therefore, in embodiments where the base station activates semi-static scheduling, the base station may identify or determine whether semi-static scheduling is configured to a BWP indicated by a BWP indicator in operation S1130.

In embodiments where semi-static scheduling is configured to a BWP indicated by a BWP indicator (i.e., in embodiments where SPS or an UL grant type 2 is configured), the base station may perform BWP switching and transmit or receive data based on configuration information and DCI for semi-static scheduling in the switched BWP in operation S1140.

In embodiments where semi-static scheduling is not configured to a BWP indicated by a BWP indicator, the base station may maintain an active DL BWP (i.e., may not perform BWP switching), and may not perform an operation for semi-static scheduling in operation S1150. Not performing an operation for semi-static scheduling may be expressed as expecting not to perform an operation for semi-static scheduling or skipping an operation for semi-static scheduling.

Alternatively, the base station may perform BWP switching in operation S1150, but may not perform an operation for semi-static scheduling. Not performing the operation for semi-static scheduling may be expressed as expecting not to perform an operation for semi-static scheduling or skipping an operation for semi-static scheduling.

The base station may configure a 'DCI processing method' of the above case through higher layer signaling (e.g., RRC signaling) to the UE. The UE may process the received DCI of the above case according to the 'DCI processing method' received through the higher layer signaling.

According to an embodiment of the disclosure, the 'DCI processing method' may be included in cell group configuration information (e.g., CellGroupConfig IE) to be equally applied to all serving cells belonging to a cell group. Further, according to an embodiment of the disclosure, the 'DCI processing method' may be included in serving cell configuration information (e.g., ServingCellConfig IE) to be independently applied to each serving cell.

Further, according to an embodiment of the disclosure, the 'DCI processing method' may be independently configured for each DCI format. That is, processing methods of a DCI format 0-1 and a DCI format 1-1 may be configured, respectively, and the processing methods of a DCI format 0-1 and a DCI format 1-1 may be configured identically or differently. According to an embodiment of the disclosure, the 'DCI processing method' may be configured as one method regardless of the DCI format.

According to an embodiment, a DCI format 1-1 processing method among 'DCI processing methods' through the RRC signaling may be one of the following methods. However, the following processing method is not applied only to a DCI format 1-1 but may be applied to other DCI formats.

If a 'DL SPS configuration' does not exist in a BWP indicated by a 'Bandwidth part indicator' field of the detected DCI format 1-1, the UEs ignores or discards the detected DCI format 1-1. In this case, the active DL BWP is not changed and maintained.

If a 'DL SPS configuration' does not exist in a BWP indicated by a 'Bandwidth part indicator' field of the detected DCI format 1-1, the UE changes a BWP indicated by a 'Bandwidth part indicator' field of the detected DCI format 1-1 to the active DL BWP, and ignores or discards 'DL SPS' related contents without processing.

According to an embodiment, a processing method of a DCI format 0-1 among 'DCI processing methods' through RRC signaling may be one of the following methods. However, the following processing method is not applied only to a DCI format 0-1 but may be applied to other DCI formats.

If an 'UL grant type 2 configuration' does not exist in a BWP indicated by a 'Bandwidth part indicator' field of the detected DCI format 0-1, the UE ignores or discards the detected DCI format 0-1. In this case, the UE does not change and maintains the active UL BWP.

If an 'UL grant type 2 configuration' does not exist in a BWP indicated by a 'Bandwidth part indicator' field of the detected DCI format 0-1, the UE changes the active UL BWP to a BWP indicated by a 'Bandwidth part indicator' field of the detected DCI format 0-1, and ignores or discards 'UL grant type 2' related contents without processing.

Figure 12:
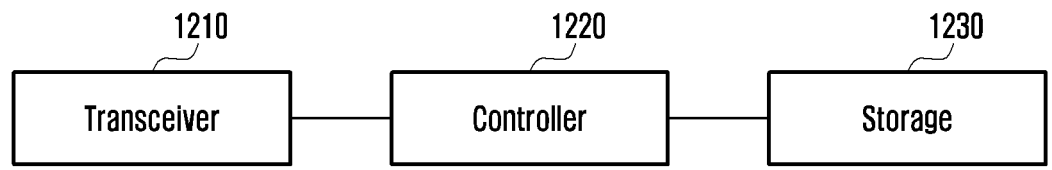
FIG. 12 is a block diagram illustrating a structure of a terminal according to an embodiment of the disclosure.

FIG. 12 is a block diagram illustrating a structure of a UE according to an embodiment of the disclosure.

With reference to FIG. 12, the UE may include a transceiver 1210, a controller 1220, and a storage 1230. In the disclosure, the controller may be defined as a circuit, an application-specific integrated circuit, or at least one processor.

The transceiver 1210 may transmit and receive a signal to and from another network entity. The transceiver 1210 may receive, for example, configuration information on semi-static scheduling from a base station. Further, the transceiver 1210 may receive control information from the base station.

The controller 1220 may control the overall operation of the UE according to the embodiment proposed in the disclosure. For example, the controller 1220 may control a signal flow between blocks to perform an operation according to the above-described flowchart. For example, the controller 1220 may receive DCI for activating semi-static scheduling according to an embodiment of the disclosure and control an operation proposed in the disclosure according to whether semi-static scheduling is configured to an active BWP or a BWP indicated by a BWP indicator included in the DCI.

The storage 1230 may store at least one of information transmitted and received through the transceiver 1210 or information generated through the controller 1220.

Figure 13:
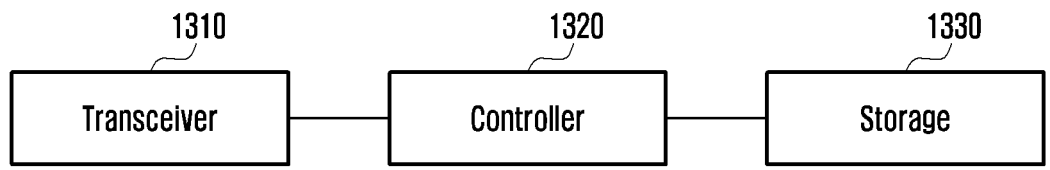
FIG. 13 is a block diagram illustrating a structure of a base station according to an embodiment of the disclosure.

FIG. 13 is a block diagram illustrating a structure of a base station according to an embodiment of the disclosure.

With reference to FIG. 13, the base station may include a transceiver 1310, a controller 1320, and a storage 1330. In the disclosure, the controller may be defined as a circuit, an application-specific integrated circuit, or at least one processor.

The transceiver 1310 may transmit and receive a signal to and from another network entity. The transceiver 1310 may transmit, for example, configuration information on semi-static scheduling. Further, the transceiver 1310 may transmit a downlink control signal to the UE.

The controller 1320 may control the overall operation of the base station according to the embodiment proposed in the disclosure. For example, the controller 1320 may control a signal flow between blocks to perform an operation according to the above-described flowchart. For example, the controller 1320 may transmit DCI for activating semi-static scheduling according to an embodiment of the disclosure and control an operation proposed in the disclosure according to whether semi-static scheduling is configured to an active BWP or a BWP indicated by a BWP indicator included in the DCI.

The storage 1330 may store at least one of information transmitted and received through the transceiver 1310 or information generated through the controller 1320.

According to an embodiment of the disclosure, a method performed by a UE in a communication system is provided. The method may include receiving configuration information on semi-static scheduling; receiving downlink control information (DCI) through a physical downlink control channel (PDCCH); determining whether the DCI activates semi-static scheduling; determining, when semi-static scheduling is activated, whether semi-static scheduling is configured to a bandwidth part (BWP) indicated by a BWP indicator included in the DCI; and discarding, when semi-static scheduling is not configured to the BWP, the DCI.

Further, according to an embodiment of the disclosure, a method performed by a base station in a communication system is provided. The method may include transmitting configuration information on semi-static scheduling; transmitting downlink control information (DCI) through a physical downlink control channel (PDCCH); determining, when semi-static scheduling is activated, whether semi-static scheduling is configured to a bandwidth part (BWP) indicated by a BWP indicator included in the DCI; and skipping, when semi-static scheduling is not configured to the BWP, an operation for semi-static scheduling.

Further, according to an embodiment of the disclosure, a UE is provided in a communication system. The UE may include a transceiver; and a controller configured to receive configuration information on semi-static scheduling through the transceiver, to receive downlink control information (DCI) through a physical downlink control channel (PDCCH) through the transceiver, to determine whether the DCI activates semi-static scheduling, to determine whether semi-static scheduling is configured to a bandwidth part (BWP) indicated by a BWP indicator included in the DCI in embodiments where semi-static scheduling is activated, and to discard the DCI in embodiments where semi-static scheduling is not configured to the BWP.

Further, according to an embodiment of the disclosure, a base station is provided in a communication system. The base station may include a transceiver; and a controller configured to transmit configuration information on semi-static scheduling through the transceiver, to transmit downlink control information (DCI) through a physical downlink control channel (PDCCH) through the transceiver, to determine whether semi-static scheduling is configured to a bandwidth part (BWP) indicated by a BWP indicator included in the DCI in embodiments where semi-static scheduling is activated, and to skip an operation for semi-static scheduling in embodiments where semi-static scheduling is not configured to the BWP.

According to various embodiments of the disclosure, in embodiments where a plurality of bandwidth parts are configured in a wireless communication system, an operation for at least one SPS configuration or configured grant configuration configured to the BWP is provided, thereby performing efficiently an operation corresponding to SPS or a configured grant.

In the drawings illustrating the method of the disclosure, the order of description does not necessarily correspond to the order of execution, and the precedence relationship may be changed or may be executed in parallel.

Alternatively, the drawings illustrating the method of the disclosure may omit some components and include only some components within a range that does not impair the essence of the disclosure.

Further, the method of the disclosure may be implemented in a combination of some or all of contents included in each embodiment within a range that does not impair the essence of the disclosure

What is claimed is:

1. A method performed by a terminal in a communication system, the method comprising:
    receiving configuration information on semi-static scheduling;
    receiving downlink control information (DCI) through a physical downlink control channel (PDCCH);
    determining whether the DCI activates semi-static scheduling;
    based on determining that the DCI does not activate semi-static scheduling, discarding the DCI;
    based on determining that the DCI activates semi-static scheduling, determining whether the semi-static scheduling is configured for a bandwidth part (BWP) indicated by a BWP indicator included in the DCI; and
    based on determining that the semi-static scheduling is not configured for the BWP, discarding the DCI.

2. The method of claim 1, wherein determining whether the semi-static scheduling is configured for the BWP indicated by the BWP indicator included in the DCI comprises:
    switching to the BWP indicated by the BWP indicator; and
    determining whether the semi-static scheduling is configured for the switched BWP.

3. The method of claim 1, further comprising activating the semi-static scheduling based on a cyclic redundancy check (CRC) of the DCI being scrambled based on a configured scheduling (CS)-radio network temporary identifier (RNTI, a value of a new data indicator (NDI) field included in the DCI being 0, and a hybrid automatic repeat request (HARQ) process number field and a redundancy version field included in the DCI satisfying a predetermined condition.

4. The method of claim 1, wherein the configuration information on the semi-static scheduling comprises at least one of semi-persistent scheduling (SPS) configuration information or ConfiguredGrant configuration information.

5. A method performed by a base station in a communication system, the method comprising:
   transmitting configuration information on semi-static scheduling;
   transmitting downlink control information (DCI) through a physical downlink control channel (PDCCH);
   in response to determining that the DCI activates semi-static scheduling, determining whether the semi-static scheduling is configured for a bandwidth part (BWP) indicated by a BWP indicator included in the DCI; and
   skipping, based on determining that the semi-static scheduling is not configured for the BWP, an operation for the semi-static scheduling.

6. The method of claim 5, wherein determining whether the semi-static scheduling is configured for the BWP indicated by the BWP indicator included in the DCI comprises:
   switching to the BWP indicated by the BWP indicator; and
   determining whether the semi-static scheduling is configured for the switched BWP.

7. The method of claim 5, further comprising activating the semi-static scheduling based on a cyclic redundancy check (CRC) of the DCI being scrambled based on a configured scheduling (CS)-radio network temporary identifier (RNTI), a value of a new data indicator (NDI) field included in the DCI being 0, and a hybrid automatic repeat request (HARQ) process number field and a redundancy version field included in the DCI satisfying a predetermined condition, and
   wherein the configuration information on the semi-static scheduling comprises at least one of semi-persistent scheduling (SPS) configuration information or ConfiguredGrant configuration information.

8. A terminal of a communication system, the terminal comprising:
   a transceiver; and
   a controller configured to:
      receive configuration information on semi-static scheduling through the transceiver,
      receive downlink control information (DCI) through a physical downlink control channel (PDCCH) through the transceiver,
      determine whether the DCI activates semi-static scheduling,
      based on determining that the DCI does not activate semi-static scheduling, discard the DCI,
      based on determining that the DCI activates semi-static scheduling, determine whether the semi-static scheduling is configured for a bandwidth part (BWP) indicated by a BWP indicator included in the DCI, and
      discard the DCI, based on determining that the semi-static scheduling is not configured for the BWP.

9. The terminal of claim 8, wherein the controller is configured to:
   switch to the BWP indicated by the BWP indicator, and
   determine whether the semi-static scheduling is configured for the switched BWP.

10. The terminal of claim 8, wherein the semi-static scheduling is activated based on a cyclic redundancy check (CRC) of the DCI being scrambled based on a configured scheduling (CS)-radio network temporary identifier (RNTI), a value of a new data indicator (NDI) field included in the DCI being 0, and a hybrid automatic repeat request (HARQ) process number field and a redundancy version field included in the DCI satisfying a predetermined condition.

11. The terminal of claim 8, wherein the configuration information on the semi-static scheduling comprises at least one of semi-persistent scheduling (SPS) configuration information or ConfiguredGrant configuration information.

12. A base station of a communication system, the base station comprising:
   a transceiver; and
   a controller configured to:
      transmit configuration information on semi-static scheduling through the transceiver,
      transmit downlink control information (DCI) through a physical downlink control channel (PDCCH) through the transceiver,
      determine whether the semi-static scheduling is configured for a bandwidth part (BWP) indicated by a BWP indicator included in the DCI, based on determining that the DCI activates semi-static scheduling, and
      skip an operation for the semi-static scheduling, based on determining that the semi-static scheduling is not being-configured for the BWP.

13. The base station of claim 12, wherein the controller is configured to:
   switch to the BWP indicated by the BWP indicator, and
   determine whether the semi-static scheduling is configured for the switched BWP.

14. The base station of claim 12, wherein the semi-static scheduling is activated based on a cyclic redundancy check (CRC) of the DCI being scrambled based on a configured scheduling (CS)-radio network temporary identifier (RNTI), a value of a new data indicator (NDI) field included in the DCI being 0, and a hybrid automatic repeat request (HARQ) process number field and a redundancy version field included in the DCI satisfying a predetermined condition.

15. The base station of claim 12, wherein the configuration information on the semi-static scheduling comprises at least one of semi-persistent scheduling (SPS) configuration information or ConfiguredGrant configuration information.

* * * * *